(12) United States Patent
Baras et al.

(10) Patent No.: US 7,750,098 B2
(45) Date of Patent: Jul. 6, 2010

(54) METHOD OF MANUFACTURING VINYLIDENE DIFLUORIDE AND TRIFLUOROETHYLENE-BASED DIELECTRIC COPOLYMERS

(75) Inventors: Christian Baras, Saint Louis (FR); Francois Bauer, Saint Louis (FR); Eric Fousson, Huningue (FR); Jean Blaise, Lyon (FR)

(73) Assignee: Institut Franco-Allemand de Recherches de Saint-Louis, Saint Louis (FR)

( * ) Notice: Subject to any disclaimer, the term of this patent is extended or adjusted under 35 U.S.C. 154(b) by 97 days.

(21) Appl. No.: 11/491,161

(22) Filed: Jul. 24, 2006

(65) Prior Publication Data

US 2007/0167590 A1   Jul. 19, 2007

(30) Foreign Application Priority Data

Jul. 28, 2005   (FR) .................................. 05 08050

(51) Int. Cl.
*C08F 12/20* (2006.01)

(52) U.S. Cl. ................. 526/249; 526/250; 526/255; 524/805

(58) Field of Classification Search ................. 526/242, 526/249
See application file for complete search history.

(56) References Cited

U.S. PATENT DOCUMENTS 3,859,262 A * 1/1975 Hartwimmer ............... 526/221

7,078,101 B1 * 7/2006 Ramotowski et al. ....... 428/421

FOREIGN PATENT DOCUMENTS

EP          0 391 421 A2      10/1990
WO     WO 02/079285 A1       10/2002

OTHER PUBLICATIONS

F. Bauer, et al., "Ferroelectric Copolymers and Terpolymers for Electrostrictors: Synthesis and Properties", IEEE Transactions on Dielectrics and Electrical Insulation, vol. 11, No. 2, Apr. 1994, pp. 293-298.

Kevin Belfield, et al., "Polymer Preprints: Synthesis and Characterization of Fluorinated TerPolymers", Division of Polymer Chemistry, Inc., American Chemical Society, vol. 43, No. 1, Spring 2002, pp. 494-495.

* cited by examiner

*Primary Examiner*—Marc S Zimmer
*Assistant Examiner*—Nicole M Buie-Hatcher
(74) *Attorney, Agent, or Firm*—Oliff & Berridge, PLC

(57) ABSTRACT

A method of manufacturing, by suspension polymerization, dielectric copolymers, including injecting an initial mixture of constituent monomers into an autoclave at constant temperature and pressure, wherein the mixture of constituent monomers including vinylidene difluoride (VDF), trifluoroethylene (TrFE), and a monomer 2 to 10 times more reactive than VDF and TrFE; and continuously reinjecting at constant pressure, as soon as the reaction is initiated and throughout the duration of polymerization, a second mixture of the constituent monomers, wherein the molar composition of the initial mixture and the second mixture are determined by calculation, in a manner known of itself, taking into account the desired molar composition of the copolymer and the higher reactivity of the third monomer.

4 Claims, No Drawings

METHOD OF MANUFACTURING VINYLIDENE DIFLUORIDE AND TRIFLUOROETHYLENE-BASED DIELECTRIC COPOLYMERS

BACKGROUND

The invention relates to the manufacture of vinylidene difluoride and trifluoroethylene copolymers, particularly terpolymers which are relaxors with electrostrictive properties.

In particular, the invention relates to copolymers including vinylidene difluoride (VDF) and trifluoroethylene (TrFE) associated with at least one monomer more reactive than they, such as 1,1-chlorofluoro ethylene (CFE).

The desired copolymers must have a relaxor property, meaning that the transformation barrier between the polar and non-polar phases is diffuse and that, at room temperature, a reversible change between these phases can be induced by an electric field with very little hysteresis. They must also have good mechanical elasticity allowing substantial longitudinal strain in an electric field.

In addition, these polymers must have electrostrictive properties, meaning that their strain is a function of the square of the electric field applied.

These characteristics must, in particular, translate into a high dielectric constant of at least over 50 and longitudinal strain induced by an electric field of at least 4%, as well as mechanical properties such as elasticity characterized by a Young's modulus of at least 0.3 GPa and good mechanical and electrical homogeneity.

Materials are known that have both strain levels induced by an electric field, high elastic energy densities, and high dielectric constants at room temperature. These materials are used in electromechanical devices that convert the electric energy into mechanical energy or vice versa. These materials are ceramics or polymers.

Ceramics, while having low hysteresis and a fast response rate, have the drawback of having low strain levels—approximately 0.1%.

The polymers on the market have the drawback of having low strains induced by an electric field corresponding to dielectric constants of less than 12.

U.S. Pat. No. 6,423,412 describes vinylidene difluoride polymers, particularly copolymers composed of x mol % of VDF and (100-x) mol % of TrFE where x is between 50 and 70 and terpolymers of vinylidene fluoride, trifluoroethylene, and hexafluoropropylene.

These polymers were cured at about 130° C. to 140° C. for about 16 hours, then irradiated in an oxygen-free atmosphere with an energy in the range of approximately 500 keV to 3 MeV in order to give rise to ferroelectric polymers with a relaxor nature which, at room temperature, have an electrostrictive strain of at least 4% when an electric field of at least 100 MV/m is applied thereto.

These polymers have a relaxor ferroelectric behavior and hence a slim polarization hysteresis loop in an electric field, coupled with high electric field breakdown strength.

However, the manufacture of the polymers described requires irradiation, and their properties are not acceptable for the desired applications of the invention.

U.S. Pat. No. 6,787,238 discloses terpolymers including vinylidene fluoride (VDF) associated with a second monomer chosen from trifluoroethylene (TrFE) or tetrafluoroethylene and with a third monomer, particularly 1,1-chlorofluoroethylene (CFE).

These polymers, when stretched past their initial length then cured at a temperature below their melting point, have induced strain, at room temperature, of at least 3% when exposed to an electric field of 100 megavolts/meter, a relative dielectric constant, at room temperature, of at least 40 at 1 kHz, and an elastic energy density at room temperature of at least 0.3 joules/cm$^3$.

In this document, the variation in longitudinal strain induced by an electric field was measured as a function of field amplitude, at room temperature, for a terpolymer composed of 60 mol % VDF, 36 mol % TrFE, and 4 mol % CFE. For this polymer, a relatively high longitudinal strain (–4.5%) is induced in a field of approximately 150 MV/in. The polymers a high elastic modulus of approximately 1 GPa corresponding to an elastic energy density of about 1 J/cm$^3$, far higher than that of piezoelectric materials. This terpolymer is composed of x mol % VDF, y mol % TrFE, and (100-x-y) mol % CFE where x is between 55 and 80 and y is between 15 and 40.

However, the terpolymers described in this document do not have the degree of performance required in the present invention.

A method for manufacturing dielectric terpolymers composed of 60 to 79 mol % vinylidene fluoride, 18 to 22 mol % trifluoroethylene, and 3 to 22 mol % chlorotrifluoroethylene is described in U.S. Pat. No. 5,087,679.

Other monomers such as tetrafluoroethylene and vinylidene fluoride can be added to the three basic monomers.

According to this method, polymerization is carried out in an aqueous suspension, i.e. with involvement of oil-soluble free-radical polymerization initiators and in the presence of a suspending agent.

The polymerization is carried out in an autoclave, preferably at a temperature of between 5° C. and 95° C., at a pressure of less than 50 kg/cm$^2$.

The polymers obtained have a dielectric constant higher than 30, at room temperature. The highest dielectric constant shown in the examples is 46.7, representing a value lower than that sought in the invention.

In *IEEE Transactions on Dielectrics and Electrical Insulation*, Vol. 11, No. 2, 2004, pp. 293-298, XP-002376851, F. Bauer, E. Fousson, Q. M. Zhang, and L. M. Lee disclose a method for manufacturing dielectric terpolymers according to which a mixture of VDF/TrFE/CFE monomers is loaded into an autoclave at constant temperature and pressure and a mixture of these constituent monomers is continuously reinjected during the polymerization reaction. However, the compounds obtained have neither good electric strength since their breakdown field value reaches only 250 V/μm nor good electrical and mechanical homogeneity.

SUMMARY

The goal of the invention is to furnish a method for synthesizing polymers whose desired properties are those of relaxor materials having electrostrictive properties. The properties common to these materials are diffuse phase transition, very slim hysteresis loop, high dielectric constant at room temperature, and high relative strain in terms of absolute value.

These polymers must have a dielectric constant of at least 50, at room temperature, high polarization induced in an electric field of at least 0.1 C/m$^2$, good electric strength translating into an electric field breakdown strength of over 400 mV/m, leading to a high electric storage energy density of at least 10 J/cm$^3$ at 350 MV/m, and induced electrical longitudinal strain greater than 4%.

In addition to the above electrical properties, the polymers according to the invention must have excellent mechanical properties such as elasticity corresponding to a Young's modulus of greater than or equal to 0.3 GPa and a stretching factor higher than 3 when they are fashioned in the form of films.

The method of the invention must ensure good electrical and mechanical homogeneity of the products obtained.

Finally, it must allow polymers to be manufactured in sufficient quantities.

Copolymers based on vinylidene difluoride may have the desired properties.

However, none of the vinylidene difluoride-based copolymers referred to in the prior documents meets the required criteria.

The attempt was therefore made to develop copolymers including at least vinylidene difluoride (VDF) and trifluoroethylene (TrFE) with a variable constituent monomer molar percentage range, but unexpected difficulties arose when these were prepared:

During manufacturing tests on VDF, TrFE, and 1,1-chlorofluoroethylene (CFE) terpolymers with different molar compositions, terpolymers with the desired properties could not be obtained.

Surprisingly, it was found that a monomer mixture far poorer in CFE than the initially expected molar composition had to be used, and that very specific operating conditions were needed.

DETAILED DESCRIPTION OF EMBODIMENTS

The invention relates to a method of manufacturing, by suspension polymerization, dielectric copolymers including at least three monomers including vinylidene difluoride (VDF) and trifluoroethylene (TrFE) associated with at least one third monomer 2 to 10 times more reactive than the former two, of the type consisting of injecting a mixture of the constituent monomers into an autoclave at constant temperature and pressure and continuously reinjecting at constant pressure, as soon as the reaction is initiated and throughout the duration of polymerization, a mixture of the constituent monomers, characterized in that the molar composition of the initial mixture and that of the reinjected mixture are determined by calculation, in a manner known of itself, taking into account the desired molar composition of the copolymer and the higher reactivity of the third monomer.

The copolymers are preferably terpolymers.

Advantageously, the terpolymers are made of vinylidene difluoride (VDF), trifluoroethylene (TrFE), and 1,1-chlorofluoroethylene (CFE).

Preferably, the terpolymer obtained is composed of x mol % VDF, y mol % TrFE, and (100-x-y) mol % CFE where x is between 40 and 70 and y is between 20 and 40 and where the sum of x and y is between 90 and 95.

According to one embodiment, the terpolymer obtained is composed of 57.9 mol % VDF, 34.5 mol % TrFE, and 7.6 mol % CFE.

In another embodiment, the terpolymer obtained is composed of 64.3 mol % VDF, 27.6 mol % TrFE, and 8.1 mol % CFE.

Preferably, an initial monomer mixture composed of $\alpha$ mol % CFE is used, wherein $\alpha$ is a number less than 1.5.

Advantageously, a monomer mixture composed of $\beta$ mol % CFE is reinjected, wherein $\beta$ is a number greater than 12.

The number $\beta$ is preferably approximately 14.

Synthesis of fluorinated polymers from monomers can be carried out by various methods, such as solution, bulk, emulsion, and suspension polymerization.

What is used is suspension polymerization, which is polymerization in an aqueous suspension carried out with the aid of oil-soluble free-radical polymerization initiators and in the presence of a suspending agent.

This method allows fragmented bulk polymerization in a medium that evacuates heat.

The initiators and suspending agents are described in the literature.

As free-radical polymerization initiators, one may cite the dialkyl peroxydicarbonates, particularly diethyl and diisopropyl peroxydicarbonates.

The suspending agent can be chosen from the cellulose ethers, such as alkyl- and alkylhydroxyalkylcelluloses.

The reaction is conducted in an autoclave, loading a mixture of the constituent monomers into the reaction space provided, in the presence of a peroxide.

The reaction kinetics depend on the pressure, preferably kept constant during synthesis, and on the temperature which is kept stable.

The monomers are injected and compressed to a pressure of between 80 and 100 bars, for example 90 bars, in the critical phase.

The reaction temperature is between 40° C. and 60° C., preferably 50° C.

The peroxide is added.

In the first tests, the mixture of constituent monomers was loaded into the reaction space provided.

For a trio of given monomers, such as VDF, TrFE, and CFE, mixtures with different molar percentages of the three constituents were tested.

With a mixture of 60.5 mol % VDF, 33.2 mol % TrFE, and 6.3 mol % CFE, under the aforesaid conditions, a non-relaxor ferroelectric terpolymer, namely one not meeting the desired criteria, was obtained.

It was assumed that CFE is more reactive than the other monomers and the synthesis was repeated, loading the same mixture into a small reaction space. Reinjections of the same monomer mixture were made sequentially at constant pressure to allow for the higher reactivity of CFE. The terpolymer thus obtained is composed of 63.8 mol % VDF, 29.5 mol % TrFE, and 6.7 mol % CFE. It has a weak relaxor effect and retains the ferroelectric property.

A number of tests were re-run, but with the monomer mixture reinjected continuously and at constant pressure. The terpolymers obtained had a high relaxor effect characterized by a relative strain of 7% at 150 V/μm and a high dielectric constant of 60.

On the other hand, the film obtained by evaporating a solvent was not homogenous, its mechanical strength was low, and its dielectric strength was only 250 V/μm.

Surprisingly, it was found that a monomer mixture having 62 mol % VDF, 35 mol % TrFE, and 3 mol % CFE led to a polymer that was eight times richer in CFE.

The idea was then born of synthesizing a terpolymer by injecting a low-CFE monomer mixture having $\alpha$ mol % CFE where $\alpha$ is less than 1.5, into the predefined reaction space.

As soon as the reaction started, a CFE-richer monomer mixture, determined by calculation, was reinjected continuously at constant pressure. This calculation enables the individual skilled in the art, taking the reactivity of CFE into account, to determine the quantities of monomers in the mixture having $\beta$ mol % of CFE to be injected, where $\beta$ is greater than 12, in order to continue the reaction and reconstitute the initial composition planned.

It should be noted that a binary gas mixture with a given VDF and TrFE composition leads to a copolymer with the same composition and remains identical throughout copolymerization when the monomers are pure.

To obtain a VDF/TrFE/CFE terpolymer with a given initial weight composition, the different reactivities of the monomers must be taken into account. In particular, the CFE monomer is for example 6 to 10 times more reactive than the VDF/TrFE binary mixture, this reactivity depending on pressure and temperature. The initial mixture of the three monomers will thus be 6 to 10 times poorer in CFE. By keeping the pressure constant at a given value and after checking the start of polymerization for a certain polymer conversion rate, one can estimate the composition of the mixture to be introduced. The reaction space and the conversion rate used thus enable the quantities of the three monomers introduced in order to reconstitute the initial composition to be determined.

At the end of the synthesis conducted in this way, it is found that a terpolymer is obtained whose composition, determined by elementary analysis, is practically the composition expected.

The product obtained is in the powder form.

Various VDF/TrFE/CFE terpolymers with a molar percentage averaging 63/29/8 were synthesized in this way.

The polymerization takes about 5 to 10 hours at a temperature of 50° C.

The terpolymer powder obtained in lots of 400 g to 1500 g is washed with deionized water and methanol, then dried.

To determine the electrical and mechanical characteristics of the products, samples in film form, about 30 µm thick, were prepared by deposition using a spinner on a silicon substrate or by coating a glass or polyethylene subtract with a methyl ethyl ketone solution containing 10% terpolymer. The films were subjected to heat treatment to stabilize them and increase their crystallinity. Gold electrodes were deposited by cathode sputtering on either side of the film to make the test capacitors.

Polarization measurements were made in the frequency range 0.1 to 1 Hz.

The strain induced under an electric field was measured at room temperature in a field range from 0 to 200 MV/m.

The terpolymers obtained under these conditions have the desired characteristics: perfect relaxors,
- dielectric constant at room temperature, measured at 1 KHz, greater than 50, relative strain in electric field already reaching 4% with a weaker field than that necessary for reaching this strain level with the other compounds of the prior art, dielectric strength of approximately 400 V/µm,
- elasticity corresponding to a Young's modulus greater than 0.3 GPa,
- mechanical strength of the film obtained by evaporating a solvent well above that of the other compounds synthesized in the past,
- easily stretchable, with a stretching factor greater than 3,
- excellent mechanical and electrical homogeneity.

The description will be better understood with the aid of the following nonlimiting examples.

Example 1

Synthesis of $VDF_{69.3}/TrFE_{24.2}/CFE_{6.5}$ Terpolymer

To obtain a terpolymer having 60.5 mol % VDF, 32.5 mol % TrFE, and 7 mol % CFE, one injects into an autoclave, with a volume of 4 liters, prefilled with 3 liters of water, a gaseous mixture of 400 g composed of 64.3 mol % VDF, 34.5 mol % TrFE, and 1.2 mol % CFE, in the presence of an initiator of the diethyl peroxidicarbonate (DEPDC) type and a suspending agent of the methylcellulose type. The operating pressure is 98 bars and the temperature, 45° C.

As soon as the reaction starts, 500 g of a gas mixture composed of 57.4 mol % VDF, 30.9 mol % TrFE, and 11.7 mol % CFE is injected continuously at constant pressure for the duration of the reaction.

When polymerization is complete, the yield is 480 g of product in the form of a fine, white powder. After washing and drying, the molar percentage composition of the terpolymer, determined by elementary analysis of the elements C, Cl, and F, is 6.93/24.2/6.5 respectively for VDF/TrFE/CFE.

The compound is fashioned into a film and then cured for 4 hours.

The Curie transition has a temperature spread.

The very slim hysteresis loop is typically that of a compound with relaxor behavior.

The dielectric constant, measured at 1 kHz, at room temperature, is 56.

The relative longitudinal strain is 5.5% for an applied field of 150 V/µm.

The elastic modulus is 350 MPa.

The material is mechanically very homogeneous.

Example 2

Synthesis of $VDF_{57.9}/TrFE_{34.5}/CFE_{7.6}$ Terpolymer

To obtain a terpolymer having 56.2 mol % VDF, 36.3 mol % TrFE, and 7.5 mol % CFE, one injects into an autoclave a gaseous mixture of 60.1 mol % VDF, 38.7 mol % TrFE, and 1.2 mol % CFE, in the presence of DEPDC and methylcellulose at a pressure of 86 bars and temperature of 46° C.

As soon as the reaction starts, a mixture of 53.2 mol % VDF, 34.2 mol % TrFE, and 12.6 mol % CFE is injected continuously at constant pressure.

After 7 hours polymerization, the molar percentage composition of the terpolymer obtained, determined by elementary analysis, is 57.9/34.5/7.6 respectively for VDF/TrFE/CFE.

The dielectric constant, measured at 1 kHz, at room temperature, is 56.

The relative longitudinal strain is 4% for an applied field of 150 V/µm.

The elastic modulus is 300 MPa.

Example 3

Synthesis of $VDF_{64.3}/TrFE_{27.6}/CFE_{8.1}$ Terpolymer

To obtain a terpolymer having 61.5 mol % VDF, 30 mol % TrFE, and 8.5 mol % CFE, one injects into an autoclave a gaseous mixture of 66.5 mol % VDF, 32.4 mol % TrFE, and 1.1 mol % CFE, in the presence of DEPDC and methylcellulose at a pressure of 90 bars and a temperature of 47° C.

As soon as the reaction starts, a mixture of 57.4 mol % VDF, 28 mol % TrFE, and 14.6 mol % CFE is injected continuously at constant pressure.

After 10 hours polymerization, the molar percentage composition of the terpolymer obtained, determined by elementary analysis, is 64.3/27.6/8.1 respectively for VDF/TrFE/CFE.

The dielectric constant, measured at 1 kHz, at room temperature, is 52.

The relative longitudinal strain is 6% for an applied field of 150 V/µm.

The elastic modulus is 320 MPa.

Example 4

Synthesis of $VDF_{59.2}/TrFE_{33.6}/CFE_{7.2}$ Terpolymer

To obtain a terpolymer having 58 mol % VDF, 34 mol % TrFE, and 8 mol % CFE, one injects into an autoclave a gaseous mixture of 62.4 mol % VDF, 36.6 mol % TrFE, and 1 mol % CFE, in the presence of DEPDC and methylcellulose, at a pressure of 88 bars and a temperature of 48° C.

As soon as the reaction starts, a mixture of 54.4 mol % VDF, 31.9 mol % TrFE, and 13.7 mol % CFE is injected continuously at constant pressure.

After 10 hours polymerization, the molar percentage composition of the terpolymer obtained, determined by elementary analysis, is 59.2/33.6/7.2 respectively for VDF/TrFE/CFE.

The dielectric constant, measured at 1 kHz, at room temperature, is 50.

The relative longitudinal strain is 6% for an applied field of 150 V/µm.

The elastic modulus is 350 MPa.

The method according to the invention can also be applied to compounds of the VDF/TrFE/CFE type with a VDF/TrFE ratio of approximately 1. The ferroelectric phase of these compounds is hence minimized and the permittivity is lower, reaching only 30.

In addition, the manufacturing method according to the invention is not limited to compounds of the VDF/TrFE/CFE type.

It can be extended to terpolymers made of vinylidene difluoride (VDF) and trifluoroethylene (TrFE) associated with a monomer chosen from chlorodifluoroethylene, 1,2-chlorofluoroethylene, vinylidene chloride, and chlorotrifluoroethylene.

The copolymers according to the invention can, in particular, be used in electric switches, storage capacitors, and acoustic transducers, and be used in hydrophones as materials with a high piezoelectric coefficient.

They can also be used as heat carriers since the large electrocaloric effect enables the temperature of the material to be increased or decreased by applying a positive or negative offset voltage, and can hence be used in textiles for soldiers.

What is claimed is:

1. A method of manufacturing, by suspension polymerization, dielectric terpolymers, the method comprising:
    injecting an initial mixture of constituent monomers into an autoclave at constant temperature and pressure, the mixture of constituent monomers comprises vinylidene difluoride (VDF), trifluoroethylene (TrFE), and 1,1-chiorofluoroethylene (CFE); and
    continuously injecting at constant pressure, as soon as the polymerization is initiated and throughout the duration of polymerization, a second mixture of the constituent monomers, the monomers of the second mixture being injected in a critical phase and being compressed to a pressure of between 80 and 100 bars, wherein
    the molar composition of the initial mixture and the second mixture are determined by calculation, in a manner known of itself, taking into account the desired molar composition of the terpolymer and the higher reactivity of CFE in the critical phase,
    the terpolymer obtained is composed of x mol % VDF, y mol % TrFE and (100-x-y) mol % CFE, where
    x is between 40 and 70, and
    the sum of x and y is between 90 and 95, and
    the amount of CFE in the initial monomer mixture is less than 1.5 mol %.

2. The method according to claim 1, wherein the terpolymer is composed of 57.9 mol % VDF, 34.5 mol % TrFE, and 7.6 mol % 1,1-chiorofluoroethylene (CFE).

3. The method according to claim 1, wherein the terpolymer is composed of 64.3 mol % VDF, 27.6 mol % TrFE, and 8.1 mol % 1,1-chlorofluoroethylene (CFE).

4. The method according to claim 1, wherein the amount of CFE in the second monomer mixture is greater than 12 mol %.

* * * * *